(12) United States Patent
Ahn

(10) Patent No.: US 12,559,081 B2
(45) Date of Patent: Feb. 24, 2026

(54) VEHICLE BRAKE

(71) Applicant: HYUNDAI MOBIS CO., LTD., Seoul (KR)

(72) Inventor: Sung Ki Ahn, Yongin-si (KR)

(73) Assignee: Microsoft Technology Licensing, LLC, Redmond, WA (US)

( * ) Notice: Subject to any disclaimer, the term of this patent is extended or adjusted under 35 U.S.C. 154(b) by 517 days.

(21) Appl. No.: 18/067,299

(22) Filed: Dec. 16, 2022

(65) Prior Publication Data

US 2023/0373453 A1 Nov. 23, 2023

(30) Foreign Application Priority Data

May 19, 2022 (KR) ........................ 10-2022-0061277

(51) Int. Cl.
| | |
|---|---|
| *B60T 17/00* | (2006.01) |
| *B01D 35/30* | (2006.01) |
| *B60T 13/14* | (2006.01) |
| *B60T 13/74* | (2006.01) |
| *B60T 17/08* | (2006.01) |

(52) U.S. Cl.
CPC .............. B60T 17/00 (2013.01); B01D 35/30 (2013.01); B60T 13/142 (2013.01); B60T 13/745 (2013.01); B60T 17/08 (2013.01); B01D 2201/302 (2013.01); B01D 2201/34 (2013.01)

(58) Field of Classification Search
CPC .... B60T 17/042; B60T 13/142; B60T 13/686; B60T 13/745; B60T 17/00; B60T 17/08; B01D 35/30; B01D 2201/34; B01D 2201/302

USPC .......................................................... 303/14
See application file for complete search history.

(56) References Cited

U.S. PATENT DOCUMENTS

| | | | | |
|---|---|---|---|---|
| 5,934,766 | A * | 8/1999 | Feigel ..................... | B60T 8/364 303/119.2 |
| 6,254,199 | B1 * | 7/2001 | Megerle .................. | B60T 8/363 137/550 |
| 2004/0232763 | A1 * | 11/2004 | Otsuka .................. | B60T 8/3615 303/119.2 |
| 2010/0264723 | A1 * | 10/2010 | Atsushi ................. | B60T 13/686 303/10 |
| 2015/0166026 | A1 * | 6/2015 | Koyama ............... | B60T 8/4872 303/115.4 |
| 2015/0375723 | A1 * | 12/2015 | Hurst .................... | F04B 53/001 137/565.11 |

FOREIGN PATENT DOCUMENTS

KR 10-2007-0104982 A 10/2007

* cited by examiner

*Primary Examiner* — Robert A. Siconolfi
*Assistant Examiner* — San M Aung
(74) *Attorney, Agent, or Firm* — NovoTechIP International PLLC

(57) ABSTRACT

The vehicle brake includes a pedal being pressed against for braking by a driver, a master cylinder unit, pressure of oil in the master cylinder being increased by the pedal, a block unit in which a hydraulic circuit unit is formed, the hydraulic circuit unit being connected to the master cylinder unit, being supplied with the oil from the master cylinder unit, and increasing the pressure of the oil when electric power is supplied thereto, a wheel cylinder unit being connected to the block unit and providing a braking force to a wheel, and a filter unit being mounted on the block unit and filtering the oil provided from the master cylinder unit.

12 Claims, 4 Drawing Sheets

50

522  521    511    514    513    512

52                    51                    53

VEHICLE BRAKE

CROSS-REFERENCE TO RELATED APPLICATIONS

This application claims priority from and the benefit of Korean Patent Application No. 10-2022-0061277, filed on May 19, 2022, which is hereby incorporated by reference for all purposes as if set forth herein.

TECHNICAL FIELD

The present disclosure relates to a vehicle brake and, more particularly, to a vehicle brake capable of preventing malfunctioning braking by filtering oil provided from a master cylinder.

BACKGROUND

Usually, in hydraulic brakes, when a driver presses against a pedal, hydraulic pressure is increased through a master cylinder, and the increased hydraulic pressure is supplied to each wheel, thereby generating a braking force. With the hydraulic pressure occurring by driving of a motor, braking pressure is provided to each wheel.

In a hydraulic brake, a motor pump and various valves are mounted on a housing block in which a flow channel is formed. The hydraulic brake is connected to each wheel. The master cylinder is connected to a flow channel in the housing block with a hydraulic pressure line in between.

In a hydraulic brake in the related art, a filter filtering oil is not provided inside the hydraulic pressure line. The master cylinder and the flow channel in the housing block are connected to each other with the hydraulic pressure line in between. Thus, there is a problem in that movement of foreign material occurring inside the master cylinder cannot be limited. Therefore, there is a need to solve this problem.

The background art of the present disclosure is disclosed in Korean Patent Application Publication No. 2007-0104982 (published on Oct. 30, 2007, and entitled Control Apparatus for Valve in Electro-Hydraulic Brake System)

SUMMARY

An object of the present invention, which is contrived to solve the above-mentioned problem, is to provide a vehicle brake capable of preventing malfunctioning braking by filtering oil provided from a master cylinder.

According to an aspect of the present disclosure, there is provided a vehicle brake including: a pedal being pressed against for braking by a driver; a master cylinder unit, pressure of oil in the master cylinder being increased by the pedal; a block unit in which a hydraulic circuit unit is formed, the hydraulic circuit unit being connected to the master cylinder unit, being supplied with the oil from the master cylinder unit, and increasing the pressure of the oil when electric power is supplied thereto; a wheel cylinder unit being connected to the block unit and providing a braking force to a wheel; and a filter unit being mounted on the block unit and filtering the oil provided from the master cylinder unit.

In the vehicle brake, the block unit may include: a block body; a master port formed in one lateral surface of the block body; a master connection portion, connecting the master cylinder unit and the block body to each other, being mounted in the master port; a filter port formed in the other lateral surface of the block body, the filter unit being installed in the filter port; a connection port, the master port and the filter port being connected to each other with the connection port in between; and a hydraulic flow channel, the filter port and the hydraulic circuit unit being connected to each other with the hydraulic flow channel in between.

In the vehicle brake, the master port may be formed in an upper portion of the block body, and a hole into which the master connection portion is inserted may be formed in the master port.

In the vehicle brake, the master port, the connection port, and the filter port may be coaxially arranged in such a manner as to be continuous with each other.

In the vehicle brake, the hydraulic flow channel may be connected to a lower end portion of the filter port in a manner that extends downward therefrom.

In the vehicle brake, the filter port may have a greater inner diameter than the connection port.

In the vehicle brake, the filter unit may include: a filter main body being inserted into the filter port and filtering the oil; a filter sealing portion being arranged between the filter main body and the filter port and preventing oil leakage; and a filter cover closing the filter port and supporting the filter main body.

In the vehicle brake, the filter main body may include: a main-body inlet portion pressing against the filter sealing portion and allowing the oil supplied through the connection port to pass through; a main-body support portion being supported on the filter cover; a main-body connection portion connecting the main-body inlet portion and the main-body support portion to each other; and a main-body mesh portion covering a space between the main-body inlet portion and the main-body support portion and filtering out foreign material contained in the oil.

In the vehicle brake, an inner diameter of the main-body inlet portion may be the same as an inner diameter of the connection port.

In the vehicle brake, an outer diameter of the main-body inlet portion may be the same as an inner diameter of the filter port.

In the vehicle brake, a plurality of the main-body connection portions may be arranged to be spaced away from each other in circumferential directions of the main-body inlet portion and the main-body support portion.

In the vehicle brake, the main-body mesh portion may be arranged inside the main-body connection portion.

In the vehicle brake, a length of the main-body mesh portion may be greater than an inner diameter of the hydraulic flow channel.

In the vehicle brake, the filter sealing portion may include: a first sealing portion being arranged between an outer circumferential surface of the main-body inlet portion and the filter port; and a second sealing portion being arranged between an end portion of the main-body inlet portion and the filter port in a manner that extends from the first sealing portion.

In the vehicle brake according to the present disclosure, the filter unit mounted on the block unit filters the oil supplied from the master cylinder unit, thereby possibly preventing the foreign material from flowing into the hydraulic circuit unit formed in the block unit.

DETAILED DESCRIPTION

Figure 1:
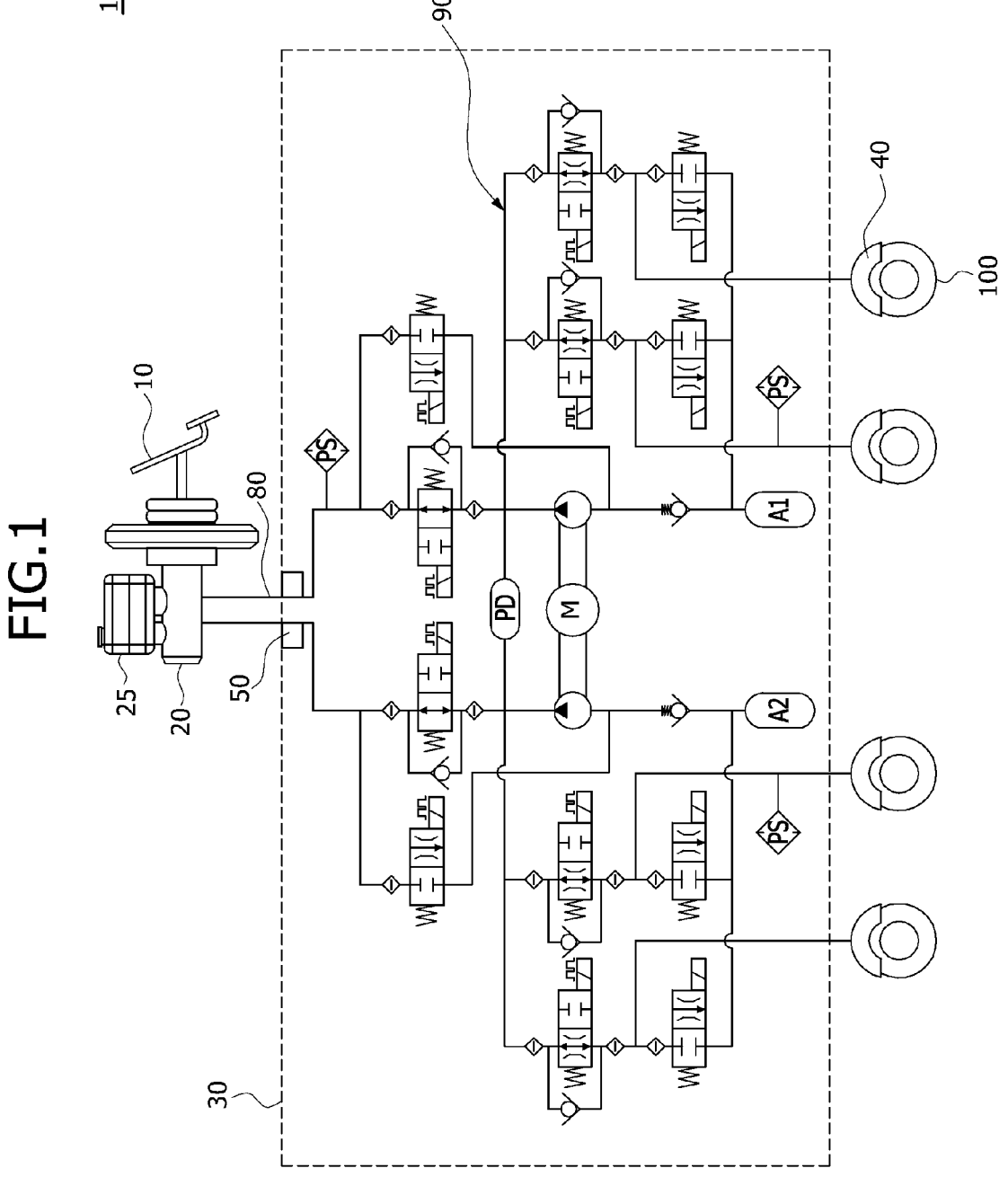
FIG. 1 is a view schematically illustrating a vehicle brake according to an embodiment of the present disclosure.

A vehicle brake according to an embodiment of the present disclosure will be described below with reference to the accompanying drawings. For clarity and convenience in description, thicknesses of lines, sizes of constituent elements, and the like may be illustrated in non-exact proportion in the drawings. In addition, a term to be assigned to a constituent element according to the present disclosure is defined considering a function of the constituent element and may vary according to a user's intention or a manager's intention or based on practices in the art. Therefore, the term should be defined in context in light of the present specification.

FIG. 1 is a view schematically illustrating a vehicle brake 1 according to an embodiment of the present disclosure. With reference to FIG. 1, the vehicle brake 1 according to the embodiment of the present disclosure may include a pedal 10, a master cylinder unit 20, a block unit 30, a wheel cylinder unit 40, and a filter unit 50.

For braking, a driver may press against the pedal 10. As an example, the pedal 10 may be positioned within a vehicle body, and the driver's foot may push down on the pedal 10 during traveling.

The pedal 10 may increase pressure of oil in the master cylinder unit 20. As an example, the master cylinder unit 20 may include a cylinder in which two chambers are formed. The cylinder may be pressurized in conjunction with the pedal 10, and thus the pressure of the oil stored may be increased. The master cylinder unit 20 may be coupled (i.e., connected) to a storage unit 25 in which the oil is stored.

A hydraulic circuit unit 90 may be formed in the block unit 30. The hydraulic circuit unit 90 is connected to the master cylinder unit 20 and is supplied with the oil. The hydraulic circuit unit 90, when electric power is applied thereto, increases the pressure of the oil. As an example, the hydraulic circuit unit 90 may include an electric pump, a flow channel, a valve, and the like. The electric pump, when electric power is applied thereto, may be driven. The oil supplied from the master cylinder unit 20 to the electric pump may be discharged along the flow channel. The valve may open and close the flow channel.

The wheel cylinder unit 40 may be connected to the block unit 30 and may provide a wheel 100 with a brake force. As an example, when high-pressure oil is supplied to the wheel cylinder unit 40, the brake force may occur to the wheel 100.

The filter unit 50 may be disposed (i.e., mounted) on the block unit 30 and may filter the oil provided from the master cylinder unit 20. As an example, the filter unit 50 may be mounted in a space formed in the block unit 30, and the oil supplied from the master cylinder unit 20 may flow through the filter unit 50 and then may flow to the hydraulic circuit unit 90. Accordingly, foreign material occurring in the master cylinder unit 20 itself may be filtered out by the filter unit 50 without flowing into the hydraulic circuit unit 90.

Figure 2:
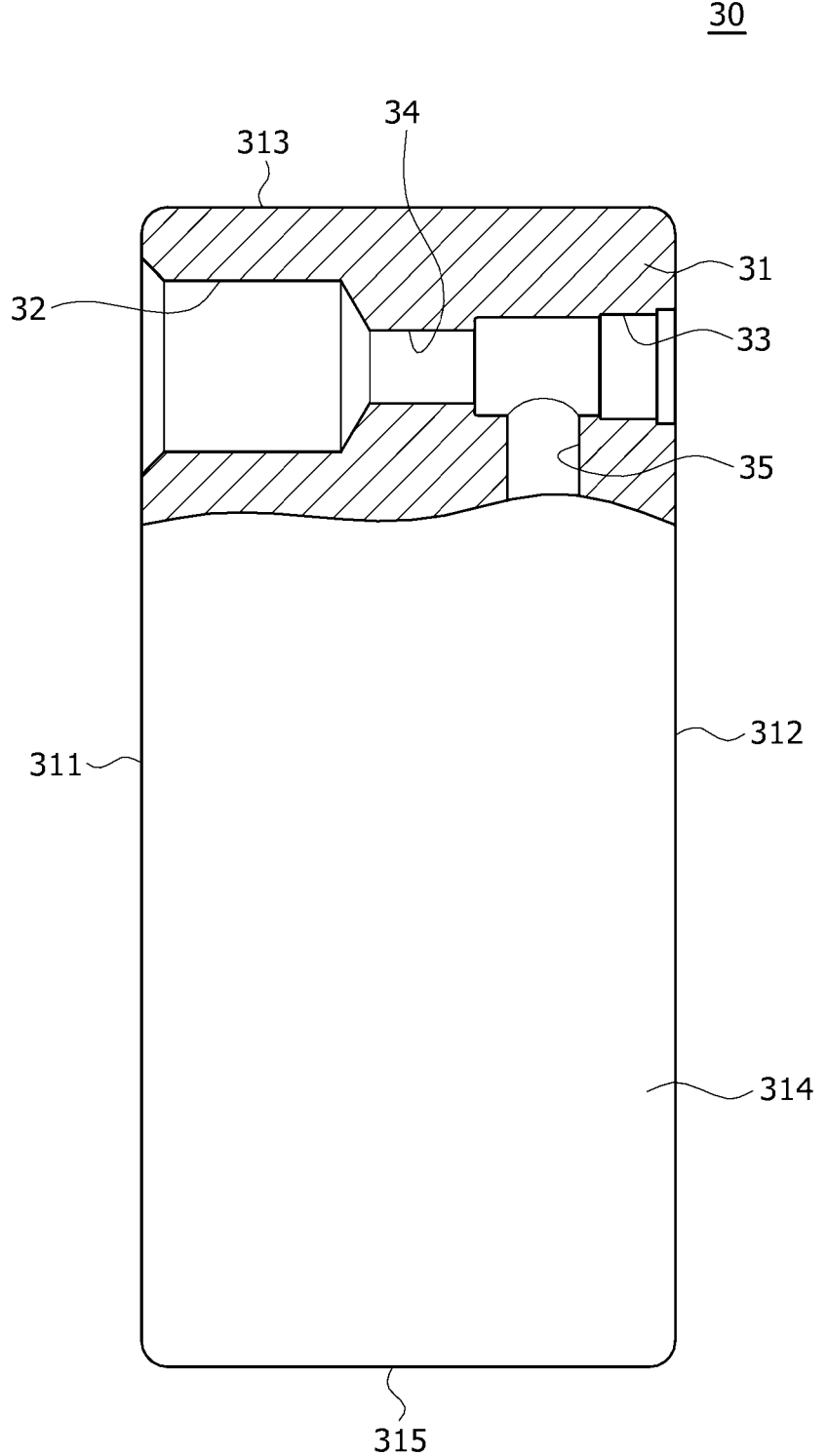
FIG. 2 is a view schematically illustrating a block unit according to the embodiment of the present disclosure.

FIG. 2 is a view schematically illustrating the block unit 30 according to the embodiment of the present disclosure. With reference to FIG. 2, the block unit 30 according to the embodiment of the present disclosure may include a block body 31, a master port 32, a filter port 33, a connection port 34, and a hydraulic flow channel 35.

The block body 31 is used in order to provide the brake force to an anti-locking and traveling dynamic control system. The block body 31 is mounted on the vehicle body. The block body 31 may be made, in the shape of a square block, from an aluminum alloy product that is manufactured using an extrusion molding method and is machined and cut off. As an example, the block body 31 may include a front surface 311, a rear surface 312, an upper surface 313, a lateral surface 314, and a bottom surface 315.

The master port 32 is formed in one lateral surface of the block body 31, and a master connection portion 80 connecting the master cylinder unit 20 and the block body 31 is mounted into the master port 32. As an example, a pair of master ports 32 may be formed in an upper portion of the front surface 311, and a hole into which the master connection portion 80 is inserted may be formed in the pair of master ports 32.

The filter port 33 is formed in the other lateral surface of the block body 31, and the filter unit 50 is installed into the filter port 33. As an example, the filter port 33 may be formed in the rear surface 312, and a hole into which the filter unit 50 is inserted may be formed in the filter port 33.

The master port 32 and the filter port 33 are connected to each other, with the connection port 34 in between. As an example, the master port 32 and the filter port 33 may be spaced away from each other, and may communicate with each other, with the connection port 34 in between. The master port 32, the connection port 34, and the filter port 33 may be coaxially arranged in such a manner as to be continuous with each other.

The filter port 33 and the hydraulic circuit unit 90 are connected to each other, with the hydraulic flow channel 35 in between. As an example, the hydraulic flow channel 35 may be connected to a lower end portion of the filter port 33 in a manner that extends downward therefrom.

At this point, the filter port 33 is designed to have a greater inner diameter than the connection port 34. That is, the oil flowing through the connection port 34 flows into the filter port 33 having a relatively greater inner diameter. Therefore, although the filter unit 50 is inserted into the filter port 33, the oil may flow smoothly.

Figure 3:
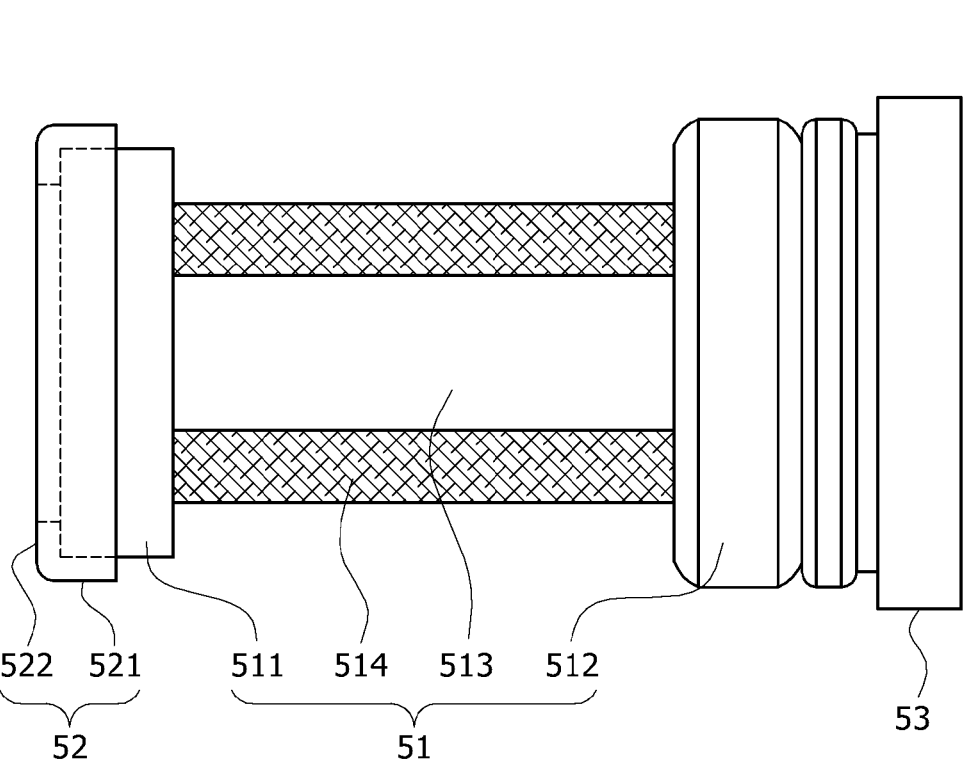
FIG. 3 is a view schematically illustrating a filter unit according to the embodiment of the present disclosure.
Figure 4:
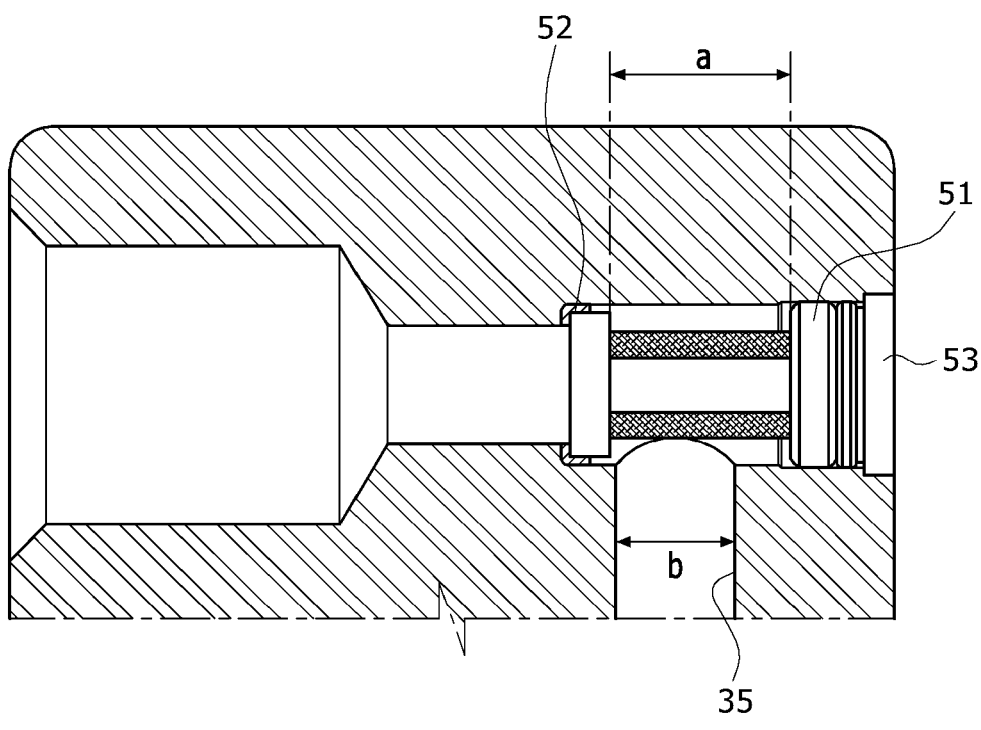
FIG. 4 is a view schematically illustrating a state where the filter unit according to the embodiment of the present disclosure is mounted on a block unit.

FIG. 3 is a view schematically illustrating the filter unit 50 according to the embodiment of the present disclosure. FIG. 4 is a view schematically illustrating a state where the filter unit 50 according to the embodiment of the present disclosure is mounted on the block unit 30. With reference to FIGS. 3 and 4, the filter unit 50 according to the embodiment of the present disclosure includes a filter main body 51, a filter sealing portion 52, and a filter cover 53.

The filter main body 51 is inserted into the filter port 33 and filters the oil. As an example, movement of the filter main body 51 may be limited due to drop connection that results from a difference in inner diameter between the filter port 33 and the connection port 34. Foreign material contained in the oil that flows in through the connection port 34 may be filtered out.

The filter sealing portion 52 is arranged between the filter main body 51 and the filter port 33 and prevents oil leakage. As an example, the filter sealing portion 52 may block the oil from flowing out of the filter main body 51.

The filter cover 53 covers the filter port 33 and supports the filter main body 51. As an example, the filter cover 53 may be combined with the filter port 33 using a self-clinching technique. In addition, in order to close the filter port 33 and thus prevent the oil leakage while supporting the filter main body 51, the filter cover 53 may have various shapes and may be combined using various techniques. The filter cover 53 may be combined with the filter port 33, thereby possibly pressing against the filter main body 51. Accordingly, the filter main body 51 may be brought into close contact with the filter sealing portion 52.

The filter main body 51 according to the embodiment of the present disclosure includes a main-body inlet portion 511, a main-body support portion 512, a main-body connection portion 513, and a main-body mesh portion 514.

The main-body inlet portion 511 presses against the filter sealing portion 52 and allows the oil supplied through the connection port 34 to pass through. As an example, the main-body inlet portion 511 may have the shape of a ring. An inner diameter of the main-body inlet portion 511 may be the same as that of the connection port 34, and an outer diameter of the main-body inlet portion 511 may be the same as an inner diameter of the filter port 33.

The main-body support portion 512 is supported on the filter cover 53. As an example, the main-body support portion 512 may have the same shape as the main-body inlet portion 511, and, when the filter cover 53 is combined with the filter port 33, may be supported on the filter cover 53.

The main-body connection portion 513 connects the main-body inlet portion 511 and the main-body support portion 512 to each other. As an example, a plurality of main-body connections portion 513 may be arranged to be spaced away from each other, in circumferential directions of the main-body inlet portion 511 and the main-body support portion 512.

The main-body mesh portion 514 covers a space between the main-body inlet portion 511 and the main-body support portion 512 and filters out the foreign material contained in the oil. As an example, the main-body mesh portion 514 may have the shape of a net. Thus, the main-body mesh portion 514 may cover the space between the main-body inlet portion 511 and the main-body support portion 512 and may allow the oil to pass through. The main-body mesh portion 514 may be arranged inside the main-body connection portion 513 and may be supported on the main-body connection portion 513.

In this case, the main-body mesh portion 514 is formed in such a manner that a length a thereof is greater than an inner diameter b of the hydraulic flow channel 35. Accordingly, the oil passing through the main-body mesh portion 514 may stably flow to the hydraulic flow channel 35. The inner diameter b of the hydraulic flow channel 35 may be the same as an inner diameter of the connection port 34.

The filter sealing portion 52 according to the embodiment of the present disclosure includes a first sealing portion 521 and a second sealing portion 522.

The first sealing portion 521 is arranged between an outer circumferential surface of the main-body inlet portion 511 and the filter port 33. The second sealing portion 522 that is to extend from the first sealing portion 521 is arranged between an end portion of the main-body inlet portion 511 and the filter port 33. That is, the first sealing portion 521 and the second sealing portion 522 may each have the shape of a ring. The first sealing portion 521 and the second sealing portion 522 may be arranged to surround the outside of the main-body inlet portion 511 and may be brought into close contact with the filter port 33. Accordingly, the oil passing through the connection port 34 may flow only to the main-body inlet portion 511 and then may pass through the main-body mesh portion 514.

Assembling and operation of the vehicle brake 1 according to the embodiment of the present disclosure that has the structure as described above are described as follows.

The filter main body 51 is inserted into the filter port 33 and the filter cover 53 is combined with the filter port 33. Thus, the filter port 33 is closed. In this case, the filter sealing portion 52 is arranged between the filter main body 51 and the filter port 33 and thus prevents the oil from flowing out of the filter main body 51. The master port 32 is connected to the master cylinder unit 20.

In a state where the vehicle brake 1 is assembled as described above, when the driver uses his/her foot to push down on the pedal 10, the oil pressurized in the master cylinder unit 20 flows through the master port 32 and the connection port 34 and then flows to the filter port 33 on which the filter unit 50 is mounted.

After flowing to the filter port 33, the oil flows through the filter main body 51 and then flows to the hydraulic flow channel 35. At this point, the foreign material contained in the oil is filtered out by the filter main body 51. Thus, the filtered oil may be supplied to the hydraulic circuit unit 90 and then may provide braking pressure to the wheel cylinder unit 40.

Since the filter unit 50 mounted on the block unit 30 filters the oil supplied from the master cylinder unit 20, the vehicle brake 1 according to the embodiment of the present disclosure may prevent the foreign material in the oil, occurring outside the block unit 30, from flowing into the block unit 30. Accordingly, the hydraulic circuit unit 90 can be prevented from malfunctioning due to the foreign material.

The embodiment of the present disclosure is described only in an exemplary manner with reference to the drawings. It would be understandable to a person of ordinary skill in the art to which the present disclosure pertains that various modifications may possibly be made to the embodiment and that various equivalents thereof may possibly be implemented. Therefore, the proper technical scope of the present disclosure should be defined by the following claims.

What is claimed is:

1. A vehicle brake comprising:

a pedal configured to be pressed by a driver to brake a vehicle;

a master cylinder unit configured to store oil, wherein a pressure of the oil stored in the master cylinder is increased by the driver's pressing of the pedal;

a block unit including a hydraulic circuit unit, wherein the hydraulic circuit unit is coupled to the master cylinder unit and supplied with the oil from the master cylinder unit, and configured to increase the pressure of the oil when electric power is supplied thereto;

a wheel cylinder unit coupled to the block unit and configured to provide a braking force to a wheel; and a filter unit disposed on the block unit and configured to filter the oil provided from the master cylinder unit, wherein the block unit comprises:

a block body;

a master port disposed at a first lateral surface of the block body;

a master connection portion disposed at the mater port and connecting the master cylinder unit and the block body;

a filter port disposed at a second lateral surface of the block body, wherein the filter unit is disposed at the filter port;

a connection port disposed between the master port and the filter port; and a hydraulic flow channel disposed between the filter port and the hydraulic circuit unit, and wherein the filter unit comprises:

a filter main body having a portion disposed within the filter port and filtering the oil;

a filter sealing portion disposed between the filter main body and the filter port and configured to prevent oil leakage; and a filter cover closing the filter port and supporting the filter main body.

2. The vehicle brake of claim 1, wherein the master port is disposed at an upper portion of the block body, and has a hole at which the master connection portion is disposed.

3. The vehicle brake of claim 2, wherein the master port, the connection port, and the filter port are coaxial and arranged continuously.

4. The vehicle brake of claim 3, wherein the hydraulic flow channel extends downwardly and is connected to a lower end portion of the filter port.

5. The vehicle brake of claim 1, wherein the filter port has inner diameter greater than that of the connection port.

6. The vehicle brake of claim 1, wherein the filter main body comprises:

a main-body inlet portion pressing the filter sealing portion, wherein the oil supplied through the connection port passes through the main-body inlet;

a main-body support portion supported on the filter cover;

a main-body connection portion connecting the main-body inlet portion and the main-body support portion; and a main-body mesh portion covering a space between the main-body inlet portion and the main-body support portion and configured to filter a foreign material contained in the oil.

7. The vehicle brake of claim 6, wherein the main-body inlet portion and the connection port have the same inner diameter.

8. The vehicle brake of claim 6, wherein an outer diameter of the main-body inlet portion and an inner diameter of the filter port are the same.

9. The vehicle brake of claim 6, wherein the main-body connection comprises a plurality of the main-body connection portions spaced away from each other and arranged in circumferential directions of the main-body inlet portion and the main-body support portion.

10. The vehicle brake of claim 6, wherein the main-body mesh portion is disposed within the main-body connection portion.

11. The vehicle brake of claim 6, wherein the main-body mesh portion has a length greater than an inner diameter of the hydraulic flow channel.

12. The vehicle brake of claim 6, wherein the filter sealing portion comprises:

a first sealing portion disposed between an outer circumferential surface of the main-body inlet portion and the filter port; and a second sealing portion extending from the first sealing portion and disposed between an end portion of the main-body inlet portion and the filter port.

* * * * *